(12) United States Patent
Chung

(10) Patent No.: US 8,177,413 B2
(45) Date of Patent: May 15, 2012

(54) SCIENTIFICALLY DESIGNED BARRIER SCREW

(76) Inventor: Chan I. Chung, Orlando, FL (US)

( * ) Notice: Subject to any disclaimer, the term of this patent is extended or adjusted under 35 U.S.C. 154(b) by 145 days.

(21) Appl. No.: 12/718,429

(22) Filed: Mar. 5, 2010

(65) Prior Publication Data
US 2011/0217406 A1 Sep. 8, 2011

(51) Int. Cl.
B29B 7/42 (2006.01)
(52) U.S. Cl. ............................................ 366/88; 366/89
(58) Field of Classification Search ............... 366/79–85, 366/88–90, 318–324; 425/204, 208, 209
See application file for complete search history.

(56) References Cited

U.S. PATENT DOCUMENTS

| | | | | |
|---|---|---|---|---|
| 3,271,819 A | * | 9/1966 | Lacher | 366/89 |
| 3,358,327 A | * | 12/1967 | Maillefer | 425/378.1 |
| 3,368,724 A | * | 2/1968 | Reifenhauser et al. | 222/413 |
| 3,375,549 A | * | 4/1968 | Geyer | 366/83 |
| 3,445,890 A | * | 5/1969 | McCormick et al. | 425/209 |
| 3,593,843 A | * | 7/1971 | Hill | 198/662 |
| 3,650,652 A | * | 3/1972 | Dray et al. | 425/206 |
| 3,698,541 A | * | 10/1972 | Barr | 366/343 |
| 3,858,856 A | * | 1/1975 | Hsu | 366/88 |
| 3,867,079 A | * | 2/1975 | Kim | 425/208 |
| RE28,901 E | * | 7/1976 | Kim | 425/208 |
| 4,000,884 A | * | 1/1977 | Chung | 366/88 |
| 4,128,341 A | * | 12/1978 | Hsu | 366/89 |
| 4,227,870 A | * | 10/1980 | Kim | 425/208 |
| 4,330,214 A | * | 5/1982 | Willert | 366/78 |
| 4,341,474 A | * | 7/1982 | Wheeler et al. | 366/88 |
| 4,405,239 A | * | 9/1983 | Chung et al. | 366/89 |
| 4,729,662 A | * | 3/1988 | O'Brien | 366/89 |
| 4,733,970 A | * | 3/1988 | Yokana | 366/79 |
| 4,770,539 A | * | 9/1988 | Heathe | 366/88 |
| 4,786,181 A | * | 11/1988 | O'Brien | 366/89 |
| 4,896,969 A | * | 1/1990 | Dray | 366/88 |
| 4,944,906 A | * | 7/1990 | Colby et al. | 264/101 |
| 5,141,326 A | * | 8/1992 | Eshima | 366/88 |
| 5,599,097 A | * | 2/1997 | Christie | 366/88 |
| 6,139,179 A | * | 10/2000 | Christiano et al. | 366/80 |
| 6,599,004 B2 | * | 7/2003 | Barr | 366/88 |
| 6,672,753 B1 | * | 1/2004 | Womer et al. | 366/88 |
| 6,988,821 B2 | * | 1/2006 | Dray, Sr. | 366/81 |
| 7,014,353 B2 | * | 3/2006 | Womer et al. | 366/88 |
| 7,156,550 B2 | * | 1/2007 | Womer et al. | 366/88 |
| 2004/0126453 A1 | * | 7/2004 | Dray, Sr. | 425/208 |
| 2004/0141406 A1 | * | 7/2004 | Womer et al. | 366/88 |
| 2011/0217406 A1 | * | 9/2011 | Chung | 425/209 |

FOREIGN PATENT DOCUMENTS

JP 63291632 A * 11/1988

* cited by examiner

*Primary Examiner* — Charles E Cooley
(74) *Attorney, Agent, or Firm* — Maier & Maier, PLLC

(57) ABSTRACT

A novel barrier screw scientifically designed with new structural features that eliminate the shortcomings of the previous barrier screws and further improve their performance. The important new structural features include a structure of originating the barrier flight without creating any dead-spot while maintaining a constant solid channel width, a structure of terminating the barrier flight without creating any dead-spot while assuring good melt quality, a melt channel structure of avoiding excessively deep channel depth while assuring sufficient melt conveying capacity, and a solid channel structure of avoiding excessively large channel area with shallow channel depth while assuring good melt quality.

16 Claims, 3 Drawing Sheets

SCIENTIFICALLY DESIGNED BARRIER SCREW

FIELD

This invention relates to an improved screw design for use in a single-screw extruder.

BACKGROUND

Single-screw extruders are most widely used in processing plastic materials for melting solid plastic into molten state, or melt, suitable for forming into desired shapes. The performance of an extruder basically depends on the geometrical features of the screw. Among various types of special screws developed to improve the extruder performance, barrier screws utilizing a barrier flight have been most successful. The barrier flight with a tight clearance divides the screw channel into a solid channel and a melt channel. Only molten plastic material can flow over the barrier flight from the solid channel into the melt channel.

Although the barrier screws significantly improve the extruder performance, all of them have some undesirable structural features and their structures still can be improved. Problems encountered with previous barrier screws include, but are not limited to, blockage to solid bed movement, degradation of plastic material at dead-spot or in deep melt channel, small solid bed pieces entering melt channel from solid channel with a large depth at the end, overheating of melt at the end of solid channel with a very shallow depth at the end, poor metering capability of very deep melt channel at the end, and undesirable melt distribution from deep melt channel into shallow metering channel in the direction opposite to drag flow.

SUMMARY

A screw for a single-screw extruder comprising a feeding section with a deep depth at the feed end of an extruder, a metering section with a shallow depth at the discharge end of the extruder, and a compression section between the feeding section and the metering section.

The compression section has at least one pair of a helical main flight with a minimum clearance to the barrel and a helical barrier flight with a tight clearance to the barrel. The main flight originates at the feed end of the screw and maintains a substantially constant lead in the feeding section, forming a helical feed channel with a substantially constant channel width and a substantially constant channel depth in the feeding section. The main flight increases its lead at or near the end of the feeding section.

The barrier flight originates proximate to the pushing side of the main flight, but is sufficiently separated from the main flight without creating a dead-spot, at a point downstream of the main flight shortly after the main flight increased its lead, forming a helical solid channel and a helical melt channel in the compression section;

The minimum clearance of the main flight, or the main flight clearance, being the possible minimum in machining and assembly of the screw and the barrel.

The tight clearance of the barrier flight is substantially more than the main flight clearance, allowing the melt to flow through the barrier flight clearance from the solid channel into the melt channel, and preventing solid plastic materials from entering the melt channel. The feed channel of the feeding section continues to become the solid channel with substantially the same channel depth and width into the compression section without substantially reducing its channel area, and without blocking the movement of tightly packed solid plastic materials from the feed channel into the solid channel.

The melt channel quickly increases its width to about 30-50% of the solid channel width over about the initial 10-30% of its length by quickly increasing both leads of the main flight and the barrier flight, and then keeping its width substantially constant until about 70-90% of its length. The melt channel starts with a depth substantially the same or deeper than the metering channel depth, that is significantly greater than the tight clearance of the barrier flight, with an opening to the solid channel or the feed channel without creating a dead-spot. The melt channel gradually increases its depth to about 150-200% of the metering channel depth over about 70-90% of its length;

The melt channel, after about 70-90% of its length, quickly increases its width to about 50-80% of the combined channel width of the solid channel and the melt channel over about the last 10-30% of its length by increasing the lead of the barrier flight and reducing the solid channel width by substantially the same amount, while quickly increasing its depth to about 170-220% of the metering channel depth over the same length.

The solid channel starts with substantially the same width as the feed channel width and keeps its width substantially constant over about 70-90% of its length. The solid channel starts with substantially the same depth as the feed channel depth and gradually decreases its depth to substantially the same as the metering channel depth over about 70-90% of its length;

The solid channel, after about 70-90% of its length, quickly decreases its width to about 20-50% of the combined channel width of the solid channel and the melt channel over about the last 10-30% of its length. The solid channel quickly decreases its depth to about 20-50% of the metering channel depth over substantially the same length and also the clearance of the barrier flight over the same length is significantly increased to about 20-50% of the metering channel depth. At the end, the solid channel has a relatively shallow depth of about 20-50% of the metering channel depth to prevent a significant amount of solid materials from entering the metering channel, while providing a sufficiently large opening to the metering channel without creating a dead-spot and minimizing the channel area with the shallow depth to avoid excessive heat generation.

The main flight and the barrier flight interchange their roles at the end of the compression section by converting the main flight to become a second barrier flight and converting the barrier flight to become a second main flight. The flight interchange results in switching the positions of the melt channel and the solid channel relative to screw rotation, making the melt distributed from the deep melt channel into the shallow solid channel occur by the drag force of screw rotation without the need of high pressure in the melt channel.

The melt channel located on a trailing side of the second main flight after the flight interchange quickly decreases its depth from about 170-220% of the metering channel depth to the metering channel depth over an axial length of the screw of about 1-3 times the diameter of the screw. The solid channel located on the pushing side of the second main flight after the flight interchange quickly increases its depth from about 20-50% of the metering channel depth to the metering channel depth over the same axial length of the screw.

DETAILED DESCRIPTION

General understanding of the geometries and functions of a screw in a single-screw extruder as presented in BACKGROUND will be helpful in understanding and appreciating the novel structural features and advantages of the exemplary embodiments of this invention. For more background information, please see Chan I. Chung, *Extrusion of Polymers, Theory and Practice* (1st ed. 2000); which is hereby incorporated by reference in its entirety.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention", "embodiment" or "invention" do not require that all embodiments of the invention include the discussed feature, advantage or mode of operation.

Figure 1:
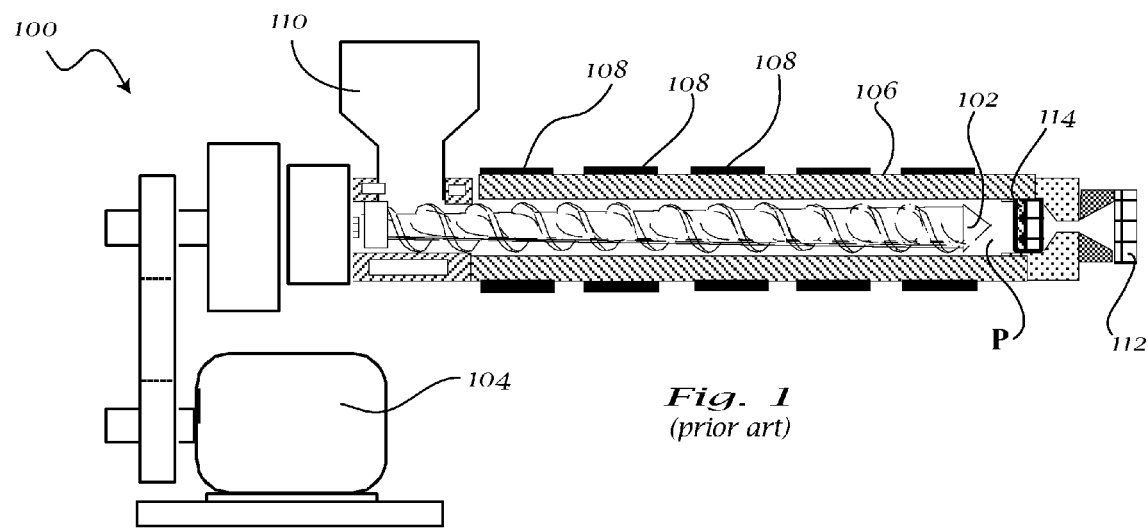
FIG. 1 is a schematic representation of a single-screw extruder with a conventional screw.

An exemplary single-screw extruder 100 with a conventional screw 102 is shown schematically in FIG. 1. The screw 102 is rotated by a motor 104, and a barrel 106 is heated by heaters 108. The design of the conventional screw 102 is shown schematically in FIG. 2. The screw 102 has one helical thread or flight 202, forming a continuous screw channel 204 with a channel depth 206 along the screw 102. The flight 202 has a minimum clearance to the barrel. The axial distance that the flight 202 travels in one turn is the pitch or lead 208 of the screw 102. Screw 102 consists of three distinct sections: a feeding section 210 with a constant depth at the feeding end of the extruder, a metering section 212 with a constant depth at the discharge end of the extruder, and a transition or compression section 214 between the feeding section 210 and the metering section 212. The depth of the feeding section 210 is much greater than that of the metering section 212, typically by 2-5 times, and the depth of the transition section 214 decreases from the depth of the feeding section 210 to the depth of the metering section 212. The length L of the flighted portion of the screw 102, or the screw length, is commonly expressed by the multiples of the screw diameter D. For example, the screw length with 30 length to diameter ratio or 30 L/D is equal to 30 times the screw diameter D. The L/D of most screws ranges about 20-45, usually around 30. The lengths and depths of the three distinct sections as well as the lead 208 of the screw 102 are designed for the specific properties of the plastic material and the specific requirements of the process. In a simple design, the lengths of the three distinct sections of the screw 102 are made about the same, each section with about one third of the screw length L, and the lead 208 of the screw 102 is made substantially equal to the screw diameter D.

Figure 2:
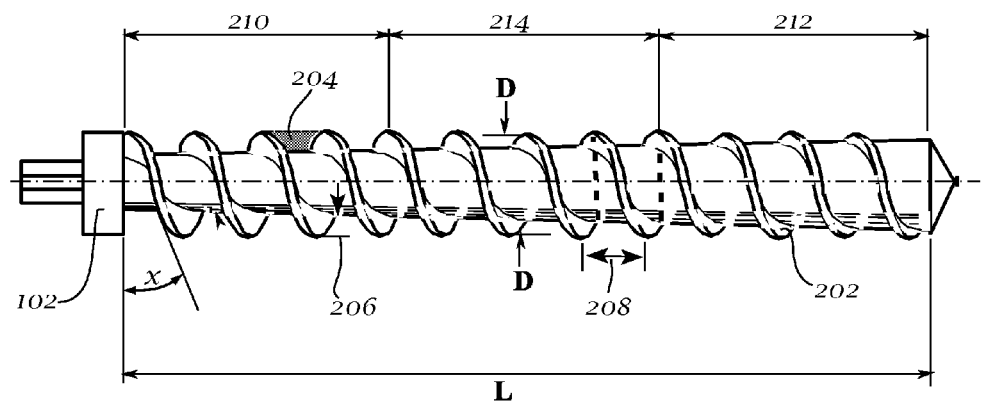
FIG. 2 is a schematic representation of a typical conventional screw.

Referring to FIGS. 1 and 2, a solid plastic material, in the form of pellet, chip, powder, or flake, etc., is fed from a hopper 110 into the screw 102. The solid plastic material fed into the screw 102 is moved downstream from the feed end to the discharge end of the extruder and compacted by the rotation of the screw 102, forming a tightly packed solid bed in the screw channel 204. Substantially complete compaction of the solid bed occurs usually at about 4-7 L/D from the hopper 110. The solid bed rotates with the screw 102, rubbing on the barrel 106 at almost the same peripheral velocity of the screw 102 and melts gradually as it slowly slides down along the screw channel 204.

Figure 3:
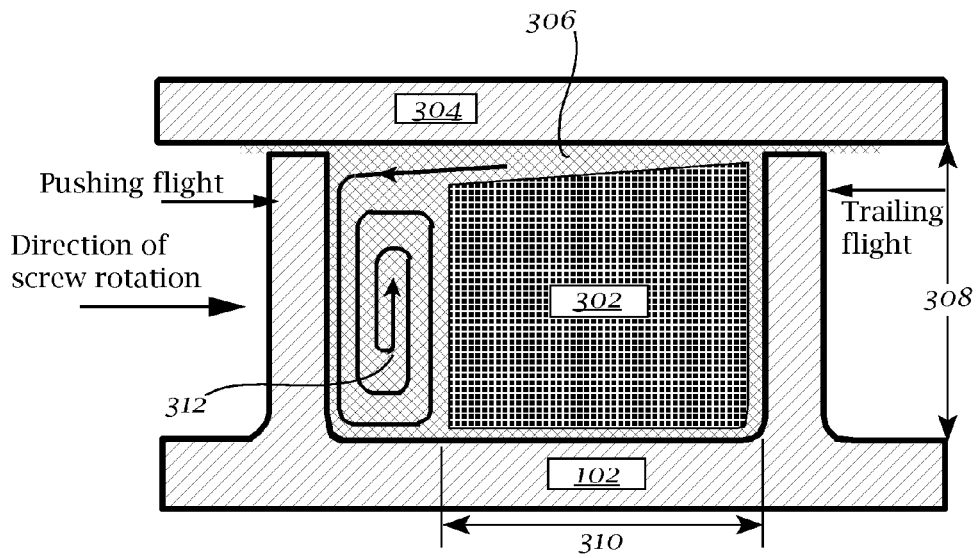
FIG. 3 shows an idealized cross-section of a conventional screw channel during melting.

The melting mechanism of the solid bed 302 is depicted in FIG. 3. A thin film of the molten plastic material or melt film 306 is formed between the solid bed 302 and the hot barrel 304, and the melt film 306 is highly sheared by the rubbing force of the solid bed 302 on the barrel 304. The motor supplies the rubbing force. Melting occurs mainly on the top surface of the solid bed 302 in contact with the barrel 304 by the heat generated in the melt film 306. The thickness 308, not the width 310, of the solid bed 302 decreases along the screw channel by melting. Plastic materials have a very low thermal conductivity, and melting by heat conduction from the hot barrel 304 is usually minimal. In fact, too much heat is generated in the melt film 306 at high screw speeds, and the barrel 304 must be cooled to remove the excess heat in order to avoid overheating the melt. The melt formed on the barrel 304 is collected by the wiping action of the rotating flight of the screw into a melt pool 312. The amount of the solid bed 302 decreases gradually along the screw channel, while the amount of the melt pool 312 increases gradually. Complete melting of the solid bed 302 before the end of the screw 102, forming a homogeneous melt pool with uniform temperature and mixing in the entire screw channel, is required for good product qualities.

Referring again to FIG. 1, the screw 102 pumps or meters out the melt through a die 112. The die 112 is attached to the barrel 106 by an adaptor. The melt is filtered by a screen pack 114 placed at the end of the screw 102 to remove large foreign solid particles, and the screen pack 114 causes a large pressure drop. The pressure at the end of the screw 102 or the head pressure P is the sum of the pressure drops through the screen pack 114, the adaptor, and the die 112.

The screw of an extruder performs three main functions; solid conveying, melting, and metering. The solid conveying capacity and the metering capacity of the screw increase almost proportional to screw speed, but the melting capacity of the screw increases far less than proportional to screw speed. Thus, complete melting of the sold bed occurs at a point farther down the screw channel as screw speed increases. Eventually, incomplete melting of the sold bed occurs inside the screw as the screw speed is increased, limiting the production rate. Furthermore, it is observed that the solid bed becomes unstable and breaks up into small solid pieces, to be called "small solid bed pieces", when it becomes small towards the end of the screw. The small solid bed pieces are mixed into the melt pool and make the melt pool inhomogeneous, also limiting the production rate.

Numerous special screw designs have been developed in order to increase the melting capacity of a screw and/or to prevent the small solid bed pieces from mixing into the melt pool. The most successful special screw designs are the barrier screws, such as those disclosed in background art U.S. Pat. Nos. 3,358,327 by Maillefer, 3,375,549 by Geyer, 3,271,819 by Lacher, 3,698,541 by Barr, 3,858,856 by Hsu, 3,867,079 by Kim, 3,650,652 by Dray and Lawrence, and 4,000,884 by Chung. These barrier screws generally have a barrier flight in the compression section in addition to the main flight, dividing the screw channel into two channels, a solid channel and a melt channel. The barrier flight generally has a tight clearance to the barrel, only allowing the melt to flow through the tight clearance but preventing incompletely molten plastic material and the small solid bed pieces from passing over the barrier flight from the solid channel into the melt channel. Although these barrier screws perform better than conventional screws, all of these barrier screws have some undesirable structural features that cause blockage to the solid bed movement, stagnation of the melt, or poor metering capability. Blockage to the solid bed movement results in the output fluctuations, and stagnation of the melt results in degradation of the melt. Poor metering capability reduces the output rate per screw revolution and increases the temperature of the melt, or the melt temperature, exiting from the extruder.

Figure 4:
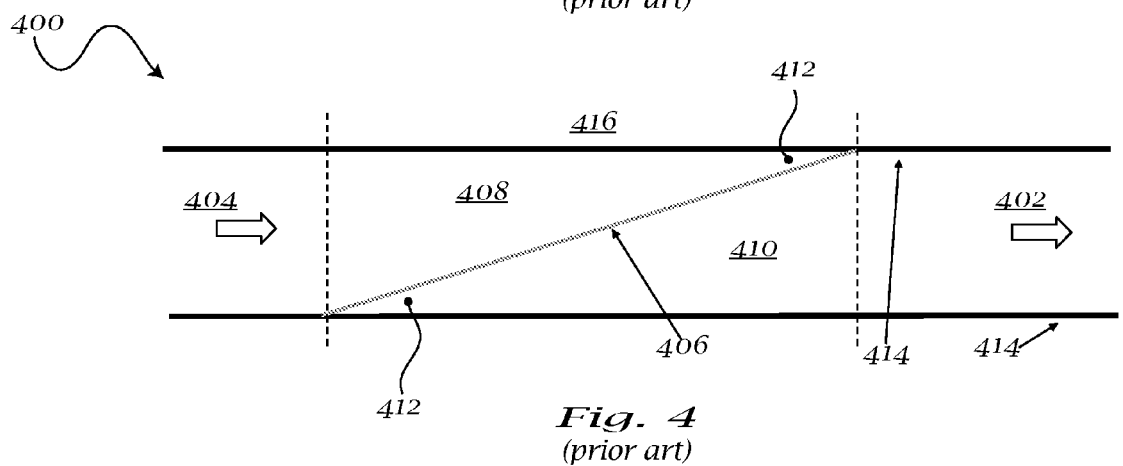
FIG. 4 shows an unwrapped screw channel of barrier screws with a diagonal barrier flight.

The background art barrier screws of U.S. Pat. Nos. 3,358,327 by Maillefer, 3,375,549 by Geyer, and 3,271,819 by Lacher essentially have a diagonal barrier flight in the compression section 416 as shown in FIG. 4. The metering channel 402 is completely separated from the feed channel 404 by a diagonal barrier flight 406. Thus, no small solid bed piece is expected in the metering channel 402 of these barrier screws. However, the diagonal barrier flight 406 makes the width of the solid channel 408 decrease and the width of the melt channel 410 increase along the screw channel. The decreasing width of the solid channel 408 forces the solid bed to reduce its width along the solid channel 408. The solid bed is tightly packed and resists any deformation in its width because the solid bed melts mainly on its surface in contact with the barrel and only the thickness of the solid bed decreases upon melting. Thus, the decreasing width of the solid channel 408 causes blockage to the solid bed movement along the solid channel 408. Furthermore, the diagonal barrier flight 406 creates dead-spots 412 at its originating point and its terminating point because it is connected to the main flight 414. These barriers screws with a diagonal barrier flight suffers from output fluctuations, especially for rigid polymer materials, caused by blockage to the solid bed movement as well as degradation of the melt at the dead-spots.

Figure 5:
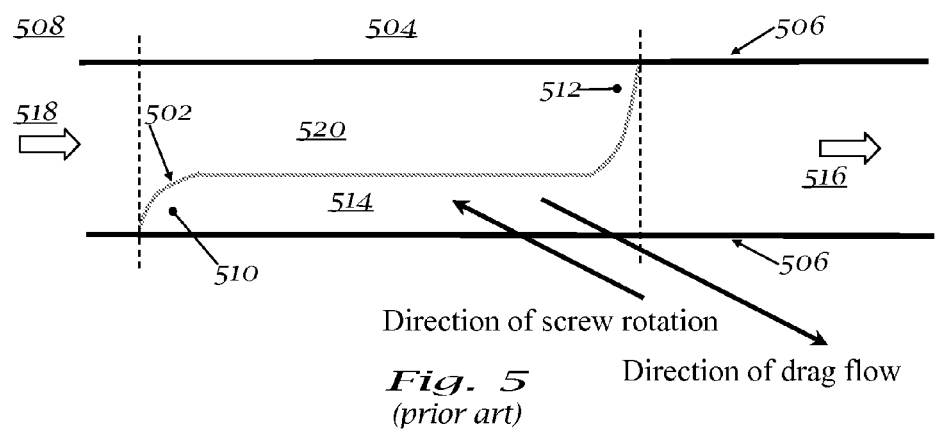
FIG. 5 shows an unwrapped screw channel of a barrier screw with a parallel barrier flight and a constant main flight lead.

The background art barrier screws of U.S. Pat. No. 3,698,541 by Barr and U.S. Pat. No. 3,858,856 by Hsu have a barrier flight parallel to the main flight, while maintaining the lead of the main flight constant throughout the entire screw. Both the width of the solid channel and the width of the melt channel stay constant once they are formed. The constant solid channel width does not cause any blockage to the solid bed movement along the solid channel. However, the barrier flight 502 in the compression section 504 originates rapidly either from the pushing edge of the main flight 506 in the case of U.S. Pat. No. 3,698,541 by Barr shown in FIG. 5, or from the trailing edge of the main flight in the case of U.S. Pat. No. 3,858,856 by Hsu, drastically reducing the area of the feed channel 518 from the feeding section 508 into the solid channel 520 in the compression section 504, usually by about 35%, at the point of its origination as well as creating a dead-spot 510 as shown in FIG. 5.

The drastic reduction of the channel area causes severe blockage to the solid bed movement, causing output fluctuations. The barrier flight 502 terminates merging with the main flight 506, creating another dead-spot 512. Furthermore, the narrow melt channel 514 becomes very deep at the end in order to accommodate increasing amount of the melt. The metering capability of a screw channel decreases as the depth to width ratio of the screw channel increases because the melt adhered on the large surfaces of the flight does not move. Thus, the narrow and deep melt channel 514 at the end has a poor metering capability. These barrier screws suffer from degradation of the melt at the dead-spot and also in the deep melt channel. The melt accumulated in the deep melt channel 514 on the pushing side of the main flight must be distributed into the metering channel 516 at the end of the compression section 504. However, the required direction of the melt distribution is in the opposite direction to the natural melt flow driven by screw rotation as explained below, and a high pressure in the melt channel 514 at the end is required for the melt distribution. The high pressure at the end of the melt channel 514 further reduces the metering rate along the melt channel, adversely affecting the performance of the screw. The melt inside a screw channel adheres on all screw surfaces and the barrel surface. The melt adhered on the screw surfaces rotates with the screw, but the melt adhered on the barrel surface does not move and stay with the stationary barrel. Thus, the stationary melt adhered on the barrel surface moves in the screw channel from the trailing side to the pushing side of the flight in the direction opposite to screw rotation as shown in FIG. 5, which is called "the drag flow". The drag flow gives the metering capability of the screw.

Figure 6:
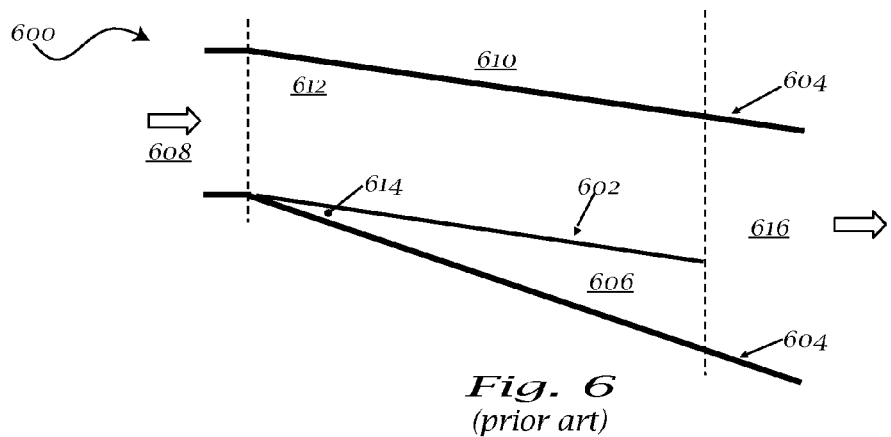
FIG. 6 shows an unwrapped screw channel of a barrier screw with a constant solid channel width throughout the feeding and compression sections with increasing main and barrier flight leads.

The background art barrier screw of U.S. Pat. No. 3,867,079 by Kim is shown in FIG. 6. This screw originates a barrier flight 602 from the main flight 604 at the end of the feeding section, forming a melt channel 606. The melt channel width is gradually increased to become about 50-100% of the width of the feed channel 608 by increasing both leads of the main flight 604 and the barrier flight 602. The feed channel 608 from the feeding section is not divided by the barrier flight 602 and its width is kept constant in the compression section 610. Thus, the width of the solid channel 612 is kept constant throughout the feeding and compression sections. This barrier screw design eliminates the blockage problem to the solid bed movement. However, both leads of the main flight 604 and the barrier flight 602 become very large towards the end of the compression section 610, and the conveying capacities of both channels decrease. The problem of a dead-spot 614 at the origination of the barrier flight 602 still remains. The solid channel 612 is open to the metering channel 616 in this design. If the end of the solid channel 612 is deeper than the clearance of the barrier flight 602 and closer to the size of the solid plastic material, incompletely molten plastic material can go into the metering channel 616. If the end of the solid channel 612 is shallow close to the clearance of the barrier flight 602, there is a large solid channel area with a very shallow channel depth and over-heating of the melt will occur in that area. The barrier screw of U.S. Pat. No. 3,650,652 by Dray and Lawrence is similar to the barrier screw of U.S. Pat. No. 3,867,079 by Kim except the major difference that the melt channel width is kept constant once it is increased to a desired width.

Figure 7:
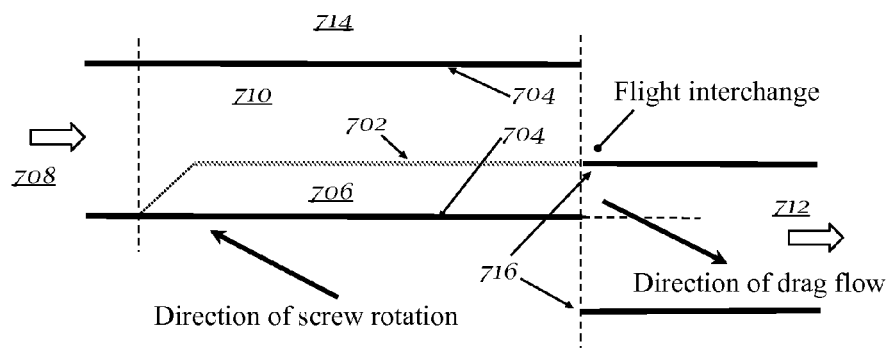
FIG. 7 shows an unwrapped screw channel of a barrier screw with an open parallel barrier flight, constant flight leads, and flight interchange.

The background art barrier screw of U.S. Pat. No. 4,000,884 by Chung is shown in FIG. 7. It has a barrier flight 702 parallel to the main flight 704 and the main flight lead stays constant similar to the barrier screw of U.S. Pat. No. 3,698,541 by Barr, but the barrier flight 702 is not connected to the main flight 704 at both the originating point and the terminating point. Thus, the melt channel 706 is open to the feed channel 708 without a dead-spot, and the solid channel 710 is open to the metering channel 712 without a dead-spot. At the end of the compression section 714, the main flight 704 terminates and the barrier flight 702 converts to become a new main flight 716. This flight interchange switches the positions of the melt channel 706 and the solid channel 710 relative to screw rotation, making the melt distribution from the deep melt channel 706 at the end into the shallow metering channel 712 occur by the drag flow of screw rotation without the need of high pressure in the deep melt channel 706. However, the width of the feed channel 708 is drastically reduced by the melt channel 706 at the start of the compression section similar to the barrier screw of U.S. Pat. No. 3,698,541 by Barr. Thus, blockage to the solid bed movement occurs at the start of the compression section 714. Because the solid channel 710 is open to the metering channel 712, this barrier screw also suffers from the same problems discussed for the barrier screw of U.S. Pat. No. 3,867,079 by Kim.

An objective of this invention is to eliminate all of the problems encountered with all of the previous barrier screws, such as blockage to solid bed movement, degradation of plastic material at dead-spot or in deep melt channel, small solid bed pieces entering melt channel from solid channel with a large depth at the end, overheating of melt at the end of solid channel with a very shallow depth at the end, poor metering capability of very deep melt channel at the end, and undesirable melt distribution from deep melt channel into shallow metering channel in the direction opposite to drag flow.

Another objective is to achieve homogeneous melt quality with uniform temperature and mixing delivered from an extruder in order to obtain good product quality and increased production rate.

Objectives ancillary to the foregoing objectives are to teach and provide a novel barrier screw to accomplish said objectives.

Aspects of the invention are disclosed in the following description and related drawings directed to specific embodiments of the invention. Some exemplary embodiments include exemplary ranges or dimensions for descriptive purposes. Additional embodiments, ranges, dimensions or similar descriptive characteristics may be utilized by a person having ordinary skill in the art without deviating from the scope of the present invention.

Figure 8:
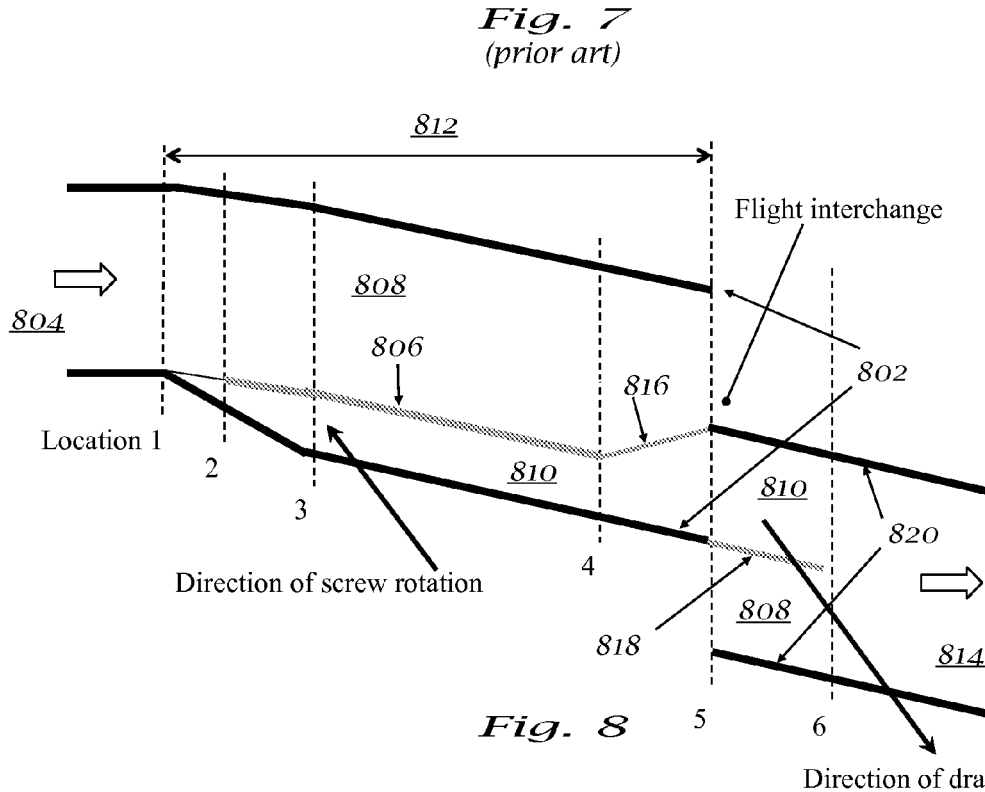
FIG. 8 shows an exemplary embodiment of an unwrapped screw channel of the scientifically designed barrier screw of this invention.

FIG. 8 is an exemplary embodiment of the present invention. Six specific locations along the screw axis from the feed end of the screw are denoted by Locations 1 to 6. A main flight 802 with a minimum clearance to the barrel originates at the feed end of the screw, forming a feed channel 804. The main flight 802 maintains its lead substantially constant in the feeding section and increases its lead at or near the end of the feeding section at Location 1. A first barrier flight 806 with a tight clearance to the barrel between Location 2 and Location 4 originates at Location 2 proximate to the pushing side of the main flight 802 shortly after the main flight 802 increased its lead. Location 2 is downstream of Location 1 by about 5-15% of the feed channel width. The first barrier flight 806 originates separately from the main flight 802 without creating a dead-spot, and it forms a solid channel 808 and a melt channel 810 in the compression section 812. The clearance of the first barrier flight 806 is more than the clearance of the main flight 802, allowing the melt to flow through the clearance from the solid channel 808 into the melt channel 810 and preventing the solid plastic material from entering the melt channel 810.

The feed channel 804 at Location 1 continues to become the solid channel 808 with substantially the same channel depth and width at Location 1 without substantially reducing its channel area, thus without blocking the solid bed movement. The melt channel 810 starts with a depth substantially the same or deeper than the metering channel depth, which gives an opening to the solid channel 808 and/or the feed channel 804 between Location 1 and Location 2 without creating a dead-spot. The exemplary structural feature of originating the barrier flight 806 downstream of the main flight 802 and separately from the main flight 802 without creating a dead-spot at the start of the melt channel 810, while converting the feed channel 804 to become the solid channel 808 without substantially reducing the width and depth to avoid blockage to the solid bed movement, is a new feature of an exemplary embodiment of this invention.

The melt channel 810 quickly increases its width to about 30-50% of the solid channel 808 width over about initial 10-30% of its length from Location 1 to Location 3 by quickly increasing both leads of the main flight 802 and the first barrier flight 806, and, afterward, keeps its width substantially constant until about initial 70-90% of its length from Location 3 to Location 4. The melt channel depth gradually increases to about 150-200% of the metering channel depth over about initial 70-90% of its length from Location 1 to Location 4. Then, the melt channel quickly increases its width to about 50-80% of the combined channel width of the solid channel 808 and the melt channel 810 over about final 10-30% of its length from Location 4 to Location 5 by increasing the lead of the first barrier flight 806 and reducing the solid channel width by substantially the same amount. The melt channel 810, after about initial 70-90% of its length, quickly increases its depth to about 170-220% of the metering channel depth over about the last 10-30% of its length from Location 4 to Location 5. The solid channel 808, starting with substantially the same width and depth as those of the feed channel 804, keeps substantially the same width over about 70-90% of its length from Location 1 to Location 4, and gradually decreases its depth to about the same as the metering channel depth over the same length. Then, the solid channel 808 quickly decreases its width to about 20-50% of the combined channel width of the solid channel 808 and the melt channel 810 over about the last 10-30% of its length from Location 4 to Location 5, and also quickly decreases its depth to about 20-50% of the metering channel depth over the same length. A second barrier flight 816 between Location 4 and Location 5, has a substantially larger flight clearance than first barrier flight 806 to accommodate a higher flow rate of the melt from the solid channel 808 into the melt channel 810 resulting from quickly decreasing solid channel area. The solid channel 808 at the end, although it has a relatively shallow depth to prevent solid bed pieces from entering the metering channel 814, is sufficiently open to the metering channel 814 without creating a dead-spot, and the solid channel area with the relatively shallow depth near Location 5 is made relatively small to substantially avoid excessive heat generation. The combined width of the solid channel 808 and the melt channel 810 is substantially constant between Location 3 and location 5. Although the width and depth of the solid channel 808 are quickly reduced towards the end of the compression section 812 between Location 4 and Location 5, blockage to the solid bed movement is substantially prevented because the solid bed becomes small and weak, and substantially breaks up after reaching Location 4. The structural feature of quickly changing the channel areas of the solid channel 808 and the melt channel 810 and utilizing the second barrier flight 816 towards the end of the compression section 812 is another new feature of this exemplary embodiment of the invention.

At the end of the compression section 812 at Location 5, the main flight 802 converts to become a third barrier flight 818 between Location 5 and Location 6, and the second barrier flight 816 converts to become a second main flight 820. This flight interchange switches the positions of the melt channel 810 and the solid channel 808 relative to screw rotation. The melt channel 810 was located on the pushing side of the original main flight 802 before the flight interchange until Location 5, but it is located on the trailing side of the second main flight 820 after the flight interchange from Location 5. The melt channel 810 now located on the trailing side of the second main flight 820 quickly decreases its depth from about 170-220% of the metering channel depth to the metering channel depth between Location 5 and Location 6, while the solid channel 808 now located on the pushing side of the second main flight 820 quickly increases its depth from about 20-50% of the metering channel depth to the metering channel depth between the same locations. The depth of the entire screw channel becomes substantially the same as the metering channel depth at Location 6. The melt distribution from the deep melt channel 810 into the shallow solid channel 808 substantially occurs between Location 5 and Location 6 effectively by the drag flow of screw rotation without the need of high pressure in the deep melt channel 810. The axial distance between Location 5 and location 6 is usually about 1-3 times the screw diameter. The flight clearance of the third barrier flight 818 is designed to be sufficiently large enough to achieve the melt distribution mostly by the drag flow but small enough to further improve the melt quality during the melt distribution. It is possible to eliminate the third barrier flight 818 between Location 5 and Location 6 to simplify the design or shorten the screw length between Location 5 and Location 6.

At least two screws of one exemplary embodiment of the invention were utilized in practice with improved performances. One screw with 120 mm diameter and about 30 L/D length was used for extruding polypropylene at the output rate of about 450 kg/hr at the screw speed of about 95 rpm and the head pressure of about 160 kg/cm$^2$ very stably without any noticeable fluctuation of the head pressure. The other screw also with 120 mm diameter and about 30 L/D length was used for extruding amorphous polyethylene terephthalate at the output rate of about 750 kg/hr at the screw speed of about 85 rpm and the head pressure of about 63 kg/cm$^2$ very stably without any noticeable fluctuation of the head pressure.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A screw for a single-screw extruder comprising:
   a feeding section with a deep depth at the feed end of an extruder, a metering section with a shallow depth at the discharge end of the extruder, and a compression section between the feeding section and the metering section;
   the compression section having at least one pair of a helical main flight with a clearance to the barrel of the extruder and a helical barrier flight with a clearance to the barrel;
   the main flight originating at the feed end of the screw and maintaining a substantially constant lead in the feeding section, forming a helical feed channel with a substantially constant channel width and a substantially constant channel depth in the feeding section;
   the main flight increasing its lead at or near the end of the feeding section;
   the barrier flight originating proximate to the pushing side of the main flight, but sufficiently separated from the main flight without creating a dead-spot, at a point downstream of the main flight shortly after the main flight increased its lead, forming a helical solid channel and a helical melt channel in the compression section;
   the clearance of the barrier flight, or the barrier flight clearance, being substantially more than the main flight clearance, allowing the melt to flow through the barrier flight clearance from the solid channel into the melt channel, and preventing a solid plastic material from entering the melt channel;
   the feed channel of the feeding section continuing to become the solid channel with substantially the same channel depth and width into the compression section without substantially reducing its channel area, and without blocking the movement of tightly packed solid plastic material from the feed channel into the solid channel;
   the melt channel quickly increasing its width to about 30-50% of the solid channel width over about the initial 10-30% of its length by quickly increasing both leads of the main flight and the barrier flight, afterward keeping its width substantially constant until about 70-90% of its length;
   the melt channel starting with a depth substantially the same or deeper than the depth of the metering section with an opening to the solid channel or the feed channel without creating a dead-spot, and gradually increasing its depth to about 150-200% of the metering channel depth over about 70-90% of its length;
   the melt channel, after about 70-90% of its length, increasing its width to about 50-80% of the combined channel width of the solid channel and the melt channel over about the last 10-30% of its length by increasing the lead of the barrier flight and reducing the solid channel width by substantially the same amount, while increasing its depth to about 170-220% of the metering channel depth over the same length;
   the solid channel starting with substantially the same width as the feed channel width and keeping its width substantially constant over about 70-90% of its length;
   the solid channel starting with substantially the same depth as the feed channel depth and gradually decreasing its depth to substantially the same as the metering channel depth over about 70-90% of its length;
   the solid channel, after about 70-90% of its length, decreasing its width to about 20-50% of the combined channel width of the solid channel and the melt channel over about the last 10-30% of its length, while decreasing its depth to about 20-50% of the metering channel depth over substantially the same length and also significantly increasing the clearance of the barrier flight over the same length;
   the solid channel, at the end, having a relatively shallow depth of about 20-50% of the metering depth to prevent a significant amount of solid material from entering the metering channel, while providing a sufficiently large opening to the metering channel without creating a dead-spot and minimizing the channel area with the shallow depth to avoid excessive heat generation;

the main flight and the barrier flight interchanging their roles at the end of the compression section by converting the main flight to become a new barrier flight and converting the barrier flight to become a new main flight;

the flight interchange resulting in switching the positions of the melt channel and the solid channel relative to screw rotation, making the melt distributed from the deep melt channel into the shallow solid channel occur by the drag force of screw rotation without the need of high pressure in the melt channel;

the melt channel located on a trailing side of the new main flight after the flight interchange quickly decreasing its depth from about 170-220% of the metering channel depth to the metering channel depth over an axial length of the screw of about 1-3 times the diameter of the screw, while the solid channel located on the pushing side of the new main flight after the flight interchange quickly increasing its depth from about 20-50% of the metering channel depth to the metering channel depth over the same axial length of the screw.

2. The screw of claim 1 wherein the compression section has more than one pair of the main flight and the barrier flight.

3. The screw of claim 1 wherein the depth and/or the width of the feed channel is not constant in the feeding section, changing gradually or stepwise.

4. The screw of claim 1 wherein the clearance of the barrier flight is not constant along about the initial 70-90% of the barrier flight, changing gradually or stepwise.

5. The screw of claim 1 wherein the clearance of the barrier flight is not constant along about the final 10-30% of the barrier flight, changing gradually or stepwise.

6. The screw of claim 1 wherein the depth of the solid channel or the depth of the melt channel changes non-gradually along the compression section.

7. The screw of claim 6 wherein the depth of the solid channel or the depth of the melt channel changes in more than two discrete steps along the compression section.

8. The screw of claim 1 wherein the depth of the solid channel or the depth of the melt channel changes in more than two discrete steps along the compression section.

9. The screw of claim 1 wherein a final depth of the solid channel is made substantially the same as a final clearance of the barrier flight at the end of the compression section.

10. The screw of claim 1 wherein the width of the melt channel at the end of the compression section becomes significantly more than 80% or significantly less than 50% of the combined width of the solid channel and the melt channel.

11. The screw of claim 1 wherein the combined width of the solid channel and the melt channel at the end of the compression section becomes less or more than the value before the melt channel increases its width.

12. The screw of claim 1 wherein the melt channel quickly increases its width over about the final 10-30% of its length with the corresponding decrease of the width of the solid channel in more than one discrete step.

13. The screw of claim 1 wherein the main flight terminates at the end of the compression section and there is no barrier flight after the flight interchange during the melt distribution.

14. The screw of claim 13 wherein the melt distribution after the flight interchange occurs over a screw axial length of less than one screw diameter.

15. The screw of claim 1 wherein the flight interchange at the end of the compression section is not made.

16. The screw of claim 1 wherein the screw is used as the first stage of a multiple stage screw that has at least one more stage consisting of a feeding or venting section, a compression section, and a metering section.

* * * * *